Dec. 5, 1939.  F. L. FULLER  2,181,990
CASH REGISTER
Filed March 24, 1938   3 Sheets-Sheet 1

INVENTOR
Frederick L. Fuller
BY
ATTORNEY

Dec. 5, 1939.   F. L. FULLER   2,181,990
CASH REGISTER
Filed March 24, 1938   3 Sheets-Sheet 2

INVENTOR
Frederick L. Fuller
BY
ATTORNEY

Dec. 5, 1939.    F. L. FULLER    2,181,990
CASH REGISTER
Filed March 24, 1938    3 Sheets-Sheet 3

INVENTOR
Frederick L. Fuller
BY
W. M. Wilson
ATTORNEY

Patented Dec. 5, 1939

2,181,990

UNITED STATES PATENT OFFICE

2,181,990

CASH REGISTER

Frederick L. Fuller, West Orange, N. J., assignor to International Business Machines Corporation, New York, N. Y., a corporation of New York Application March 24, 1938, Serial No. 197,818

4 Claims. (Cl. 101—93)

This invention relates to printing mechanisms and more particularly to sales and check printing mechanisms provided for cash registers.

Machines of the above type have, heretofore, been provided with check printing mechanisms for issuing a check and for printing thereon data related to the cash register transaction. Machines of the above type have also been provided with means for printing upon an inserted sales slip in lieu of an issued check.

The main object of the present invention is to provide an improved form of check and sales slip printing mechanism for cash registers.

In one form of check issuing and printing mechanism an electroprinting roller has been utilized for printing a back-ground impression on a check, and for printing the data from date printing wheels carried by the electro-roller. When an impression is to be effected upon a sales slip it is desirable to prevent the impression by the electro-roller and also from the date printing wheels. One manner of attaining this object was to carry the electro-roller eccentrically and rotating it eccentrically when slip printing operations are selected to prevent contact of the electro-roller with an associated platen roller. The driving connections from the electro-roller and the platen roller were, nevertheless, retained, so that a considerable amount of power was expended in uselessly driving the electro-roller and platen roller in slip printing operations.

The main object of the present invention is to devise a selectively operated connection for the electro and platen rollers from the driving mechanism of the machine which is disabled during slip printing operations, thereby decreasing the load on the machine for such printing operations.

Another object of the present invention is to provide two impression platens, one of which is operable for each check and slip printing operation for taking an impression from the amount, transaction, and clerk's character printing wheels upon a check or sales slip, and a separable operable platen for taking an impression from data printing wheels upon the issued check only.

A still further object of the present invention is to devise a means for operating the data printing platen by the same means that causes the rotation of the electro and platen rollers.

Another object of the present invention is to provide a "slip" key, which is depressed prior to an operation of the machine, controlling means to prevent the operation of the check feeding and date printing means when an impression is effected upon a sales slip.

A still further object of the present invention is to devise a clamp firmly clamping the check strip and suspending the effectivity of the clamp during check feeding operations.

While the invention has been shown in connection with a cash register the improvements may, separately or collectively, be utilized in connection with other types of machines, and it is not the intention to be limited by the showing made, as the present disclosure of the present invention is to be considered as illustrative and not restrictive.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Manipulative entry control devices

Figure 1A:
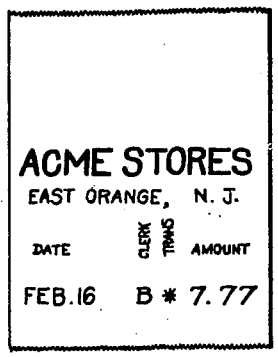
Fig. 1a is an illustration of a printed check.
Figure 1:
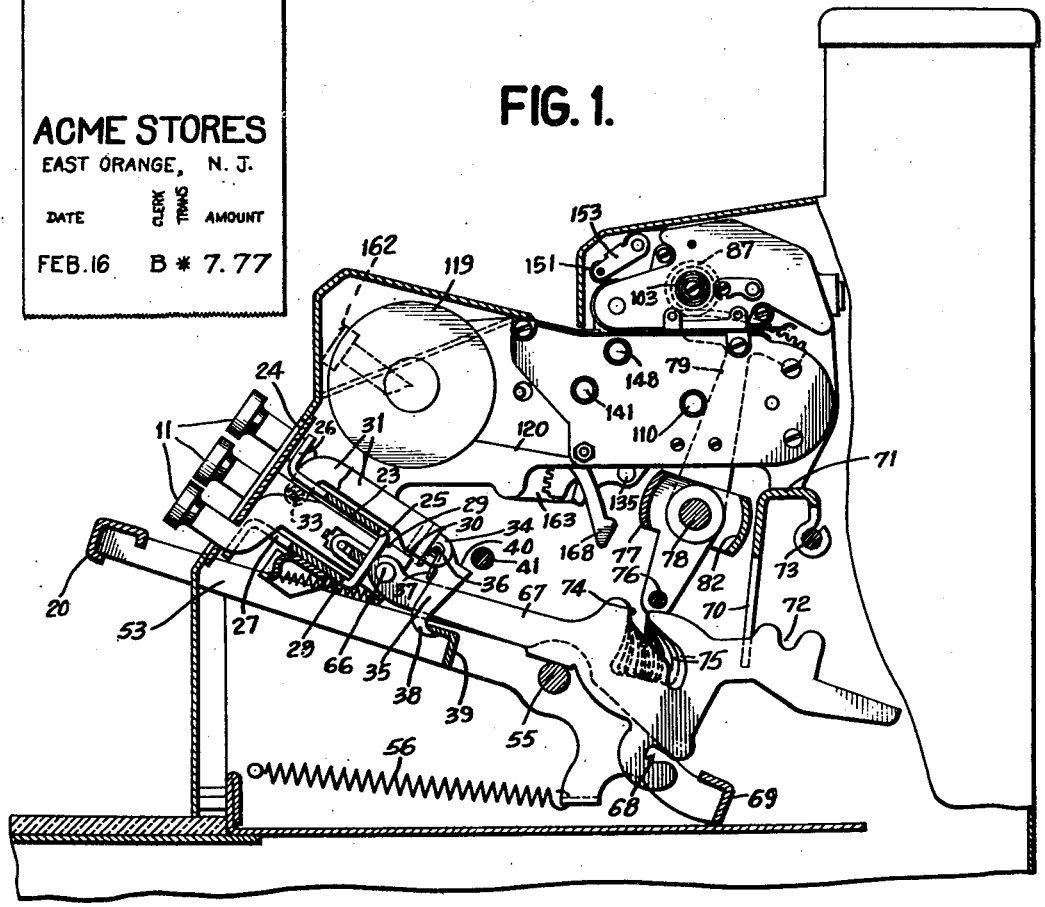
Fig. 1 is a cross sectional view of the cash register to which the present improvements are preferably applied and shows in detail the controlling keys for the dimes bank and the associated differential mechanism.

The machine preferably includes three denominational groups of amount keys, there being one group for entering cents, one group for entering dimes, and one group for entering dollars, numeral 11 in Fig. 1 designating the group of keys for entering dimes.

In addition to these keys there may be provided keys designated "Cash," a key designated "Paid out," a key designated "Rec'd on acct.", a key designated "No sale" and a key designated "Chge." This latter group of keys comprises the transaction control keys.

For the selective entry of amounts according to a clerk's classification, as explained in the patent application above referred to, there may be provided an "A" clerk's key and a "B" clerk's key.

The keys of the groups of amount keys are depressed according to the amount to be entered, the clerk's keys according to which clerk enters the amount and the transaction keys according to the type of transaction, as is well known and understood.

Each of the keys selected for operation is manually depressed prior to an operation of the machine which is effected by a transverse operating bar 20, and a key is locked in its depressed position by a construction now to be explained in detail for the group of dimes keys 11, although it is to be understood that a similar construction is utilized for the other groups of keys.

Suitably attached to the side frames of the machine is a transverse cover plate 24 for the groups of keys. The key caps are mounted outside of the plate 24 to provide for a convenient manual manipulation. The stem of each key passes through a related slot in the cover plate 24 and is further guided by a slot 25 in a U-shaped plate 23. With the exception of the center key of a single line of keys from bottom to top the key stem is also guided by slots 26 and 27 in the U-shaped plate 23. Each key is held in its normal outward position by a related spring 28 but when a key is depressed inwardly a notch 29 thereof is caught by a detent plate 30 of the respective bank of keys. Each detent plate is carried by a pair of arms 31, pivotally mounted at 33 to projecting ears of the U-shaped plate 23.

The detent plate 30 is so constructed that it is of the flexible type, i. e., an erroneously depressed key may be released by merely depressing another key in the same group. It is further understood that there is a detent plate 30 for each group of keys.

*Key releasing devices*

It is, of course, necessary to release the depressed keys after an operation of the machine and to this end as best shown in Fig. 1 each detent plate 30 has secured thereto a bracket plate 34 to which is pivoted at 36 a spring urged pawl 35. A coil spring 37 urges the pawl 35 counterclockwise so that a curved portion 38 normally hooks under a right angled bar 39 which is part of the main operating member. During the initial depression of bar 39 the pawl 35 will be rocked clockwise idly until the curved portion 38 is free of the bar 39 whereupon the spring 37 will cause the pawl 35 to take a position with the curved portion 38 now over the bar 39. When the bar 39 has been fully depressed and then returned the bar 39 will in its elevation strike the pawl 35 elevating the pawl 35 since the line of force acts through the center of the pivot 36. This will cause the rocking of the detent plate 30 about its pivot disengaging the same from the notch 29 of the depressed key releasing it for its return to normal by its spring 28. Upon continued elevation of the pawl 35 a straight edge 40 thereof will strike a stationary rod 41 and upon continued elevation of the pawl 35 by the bar 39 the pawl 35 will rock clockwise until its curved portion 38 is free of the bar 39, whereupon spring 37 will be effective to rock the pawl 35 counterclockwise to its normal position shown in Fig. 1 with the curved portion 38 now hooking under the bar 38.

*Main operating bar*

The main operating bar previously referred to comprises a pair of arms 53 loosely pivoted on a stationary rod 55 and between which arms is carried the bars 20 and 39. The bar 20 is exterior of the cabinet, as is shown in Fig. 1, and is depressed manually, the arms 53 rocking about the rod 55 and against the action of a return spring 56.

*Differential mechanism*

As is best shown in Fig. 1 pivoted at 66 to a key stem is a related key cam 67 having a coupling notch 68 engageable with a coupling bar 69 when the associated key is depressed. The coupling bar 69 is part of the operating member and is carried by rearward extensions of the arms 53. Each group of keys has a related series of key cams 67 so that a selected one may be coupled to the coupling bar 69 and rocked individually counterclockwise by the depression of the operating member 20.

Each key cam 67 is guided at its rearmost end by slots 70 in a stationary guide plate 71 and when the selected key cam 67 has been rocked to its extreme position by the bar 69 a notch 72 thereof will be received by a rod 73. The key cams 67 normally rest upon the shaft 55.

When a selected key cam 67 is shifted rearwardly and held in shifted position by virtue of the locking of the related depressed key a dwell or entrance 74 of a cam slot 75 will register with a rod 76 of a differentially rockable frame. Fig. 1 shows the construction of the cam slots 75 of the key cams 67 for the dimes group in which it will be observed that the cam slots 75 are graded so that the rod 76 may be rocked differentially when a key cam 67 is rocked and commensurate with the digital representation of the key depressed. It is obvious that only the particular key cam 67 selected will be actuated, the others of the same group remaining in normal position.

As is best shown in Fig. 1 the rod 76 for the dimes group is carried by a U-shaped frame 77 loosely mounted on a shaft 78. Attached to a side arm of the frame 77 is a tens entering segment 79. The rod 80 for the cam plates 67 of the cents group is carried by a U-shaped frame 81 loosely mounted on the shaft 78 and to the frame 81 there is connected a bail 82 to which is attached the units entering segment 83. The rod 84 for the dollars group is carried by a U-shaped frame 85 loosely mounted on shaft 78 and to said frame there is secured a dollars entering segment 86.

*Check and sales slip printing mechanism*

Figure 4:
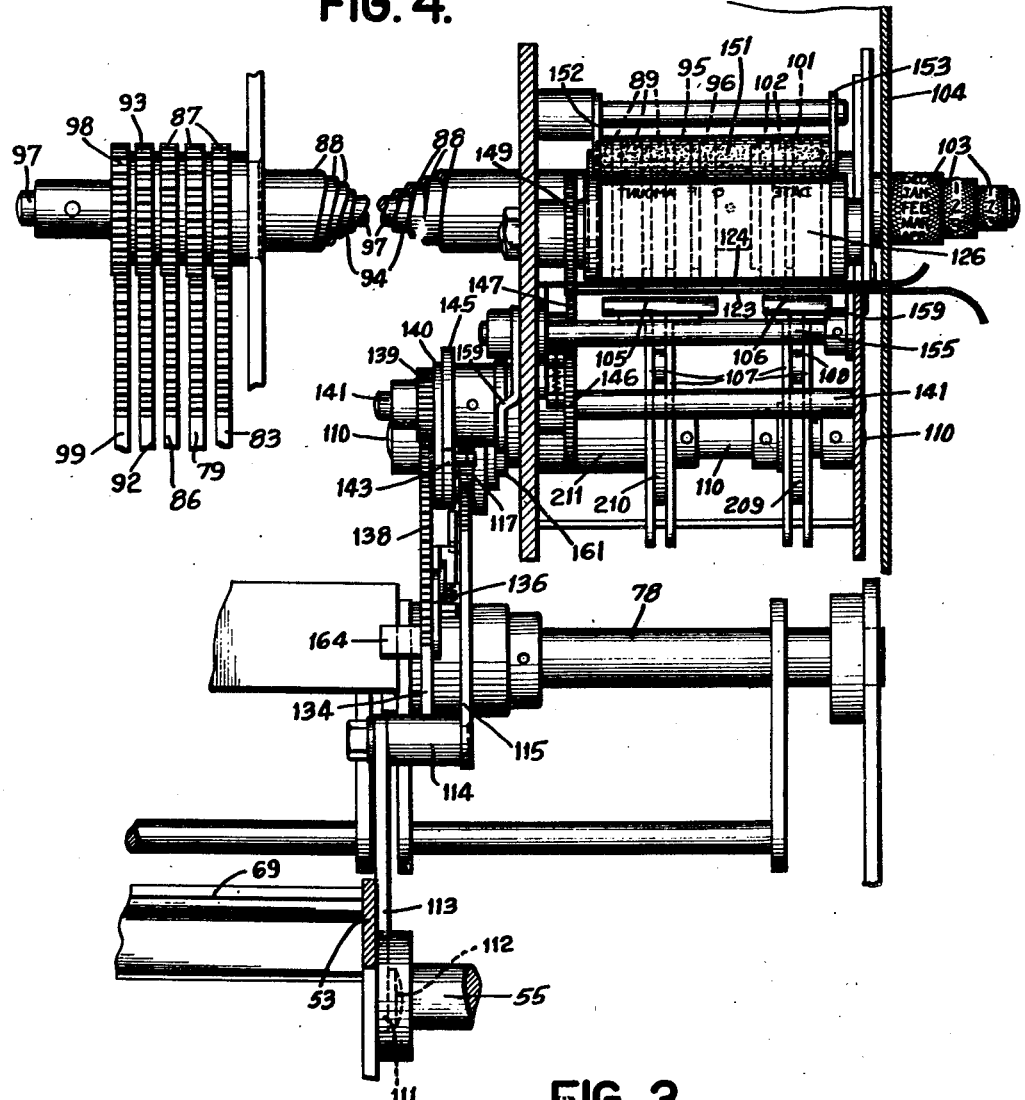
Fig. 4 is a view in front elevation of the improved form of sales and check printing mechanism.

Part of each of the segment 79, 83 and 86 is shown in front elevation in Fig. 4 and each segment is adapted to be in continuous mesh with a related gear wheel 87. The gear wheels 87 have sleeve connections 88 to amount printing type wheels 89 which are set according to the keys depressed in the three denominational amount groups and, as will be explained hereinafter, when differentially set, an imprint is taken on a check from the group of type wheels set under control of the segments 79, 83 and 86 and from other type now to be referred to.

Figure 2:
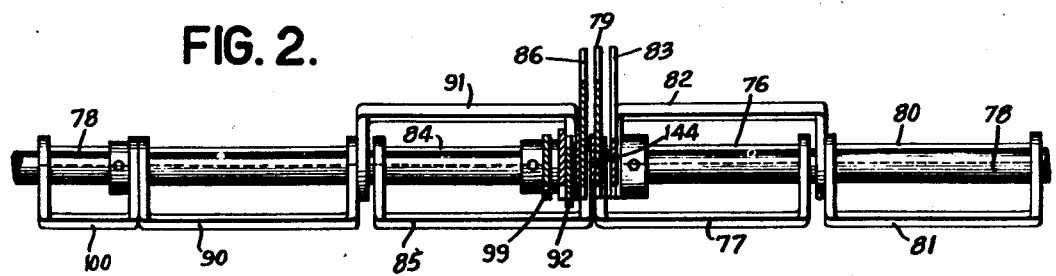
Fig. 2 is a plan view, partially in section, and shows in detail the differentially rockable frames for the several sets of controlling keys and the cross over connections for operating the differentially actuatable segments.

The set of transaction keys are adapted by means of a differential mechanism of the type previously described to rock a frame 90 (Fig. 2) and through a cross-over bail 91 differentially set a segment 92 and a pinion 93 in mesh therewith (see also Fig. 4) to set through a sleeve 94 a printing gear wheel 95 having thereon printing characters representing the transaction key depressed.

Figure 3:
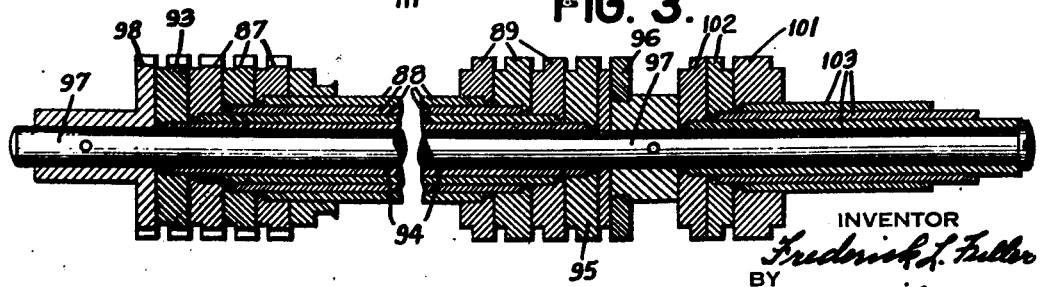
Fig. 3 is a sectional view of a tube line showing the sleeve connections between operating gears and the related type printing wheels.

It is also desirable to set a type wheel to identify the clerk entering the amount. The clerk's character printing wheel 96 (Fig. 3) is normally set to print the letter "B" but may be rocked under control of the "A" clerk's key to set the "A" character to printing position. This is effected by means now to be described. The clerk's character type wheel 96 is secured to the shaft 97 which carries the connecting sleeves and the different type wheels. To the shaft 97 there is secured a pinion 98 (Fig. 4) meshing with a segment 99 (Fig. 4) attached to the shaft 78 (see Fig. 2). The frame 100 which is rocked only by the "A" clerk's key is also secured to the shaft 78.

The check printing mechanism is also provided with date printing wheels comprising a month printing wheel 101, and two day printing wheels 102 which are manually settable by knurled sleeves 103 (see Fig. 4) positioned exterior of the side plate 104 of the cabinet.

The means for effecting printing impressions from the various type wheels comprises a rubber impression block 105 for taking printing impressions from the three amount printing type wheels 89, the transaction printing type wheel 95 and the clerk's printing type wheel 96 upon either an issued check or inserted sales slip and a supplemental rubber impression block 106 for taking an impression from the date printing wheels 101 and 102 upon the issued check only.

Each rubber impression block is carried by slidably guided spaced parallel side plates 107 between which is carried a roller 108 cooperating with a profile cam. The profile cam 209 carried by a reciprocating shaft 110 operates the impression block 106 while a profile cam 210 attached to a sleeve 211 loose on the shaft 110 operates the impression block 105.

Figure 5:
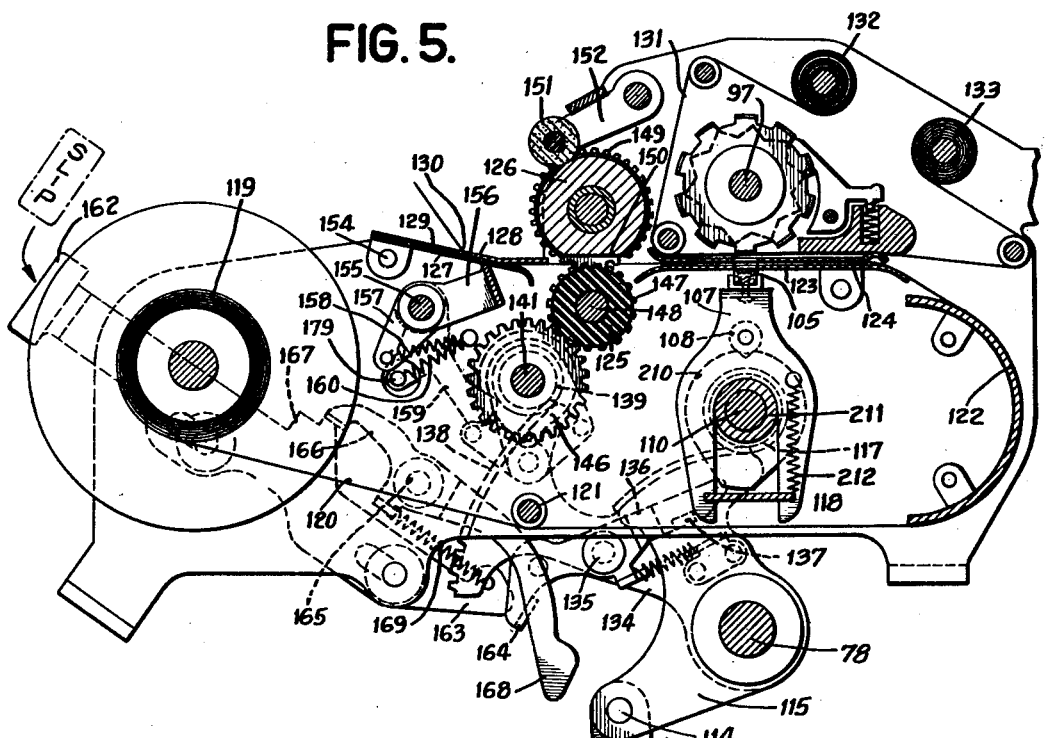
Fig. 5 is a sectional view of the improved form of sales and check printing mechanism.

As best shown in Figs. 4 and 5 one of the arms 53 has an extension 111 to which is pivoted at 112 a link 113 which is pivotally connected by a stud 114 to a segment 115 loosely mounted upon the shaft 78. The teeth of the segment 115 are in continuous engagement with a gear 117 secured to the sleeve 211. It is obvious that when the main operating bar 20 is depressed the link 113 will be elevated so as to rock the segment 115 in a clockwise direction thereby turning the gear 117, sleeve 211, and cam 210 in a counterclockwise direction. When the operating bar 20 is restored, the segment 115 will be rocked in a counterclockwise direction and the shaft 110 in a clockwise direction. During the initial clockwise rotation of the cam 210, the cam portion 118 thereof will strike the related roller 108 thereby raising the related rubber impression block 105 to take an impression from the set of amount printing type wheels and the clerk's and transaction printing type wheels. The cam 210 operating the rubber impression block 105 is secured to the shaft 110 in such a position that the high portion 118 thereof will elevate the rubber impression block 105 after the transaction, amount, and clerk's printing type wheels have been set to predetermined positions. A spring 212 (Fig. 5) is provided to return the impression block 105 to its normal position.

The printing impressions from all of the sets of type may be effected upon a check strip and from all of the type except the date printing wheels on an inserted slip, depending upon the form of receipt desired.

For printing upon the check paper, there is provided a supply roll 119 of check paper, the check paper strip 120 being drawn from the supply roll and passes under a roller 121 (Fig. 5), around a guide plate 122, between guide plates 123 and 124 which are apertured so that each impression block 105 and 106 may pass through the aperture to effect a printing impression from the type wheels, the check paper strip thereafter passing between a feed roller 125 and an electroprinting roller 126, thence, over a resilient plate 127 and under a plate 128, the end of the strip passing through an aperture 129 of the upper plate 128. The edge 130 of the upper plate 128 is serrated so as to provide a suitable tearing edge for the portion of the check paper which has been fed during the check feeding operation.

For inking the sets of type, there is provided an inking ribbon 131 which passes from a supply roll 132 to a storage roll 133 and the inking ribbon 131 is so located that it passes directly beneath all of the sets of printing type so as to ink them. Any suitable means may be provided for feeding the inking ribbon 131 step by step so as to present successive portions of the inking ribbon 131 to the type as the successive impressions are effected. Such means are well known in the art and for this reason are not described herein since they form no part of the present invention.

Figure 8:
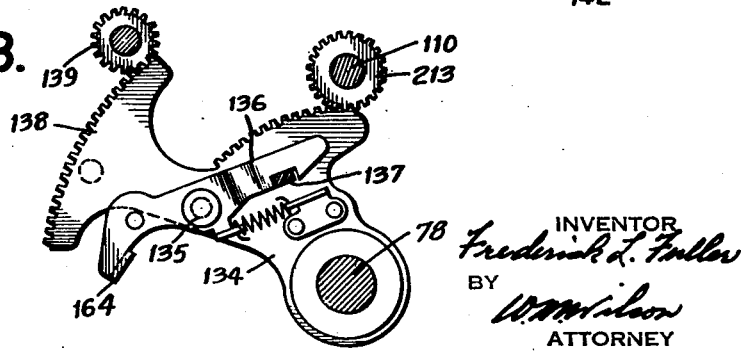
Fig. 8 is a detail of a driving segment operable upon check feeding operations.

It is desirable to feed the check paper a predetermined amount for each check printing operation and to carry out the above function there is loosely mounted upon the shaft 78 a segment 134 to which is pivoted at 135 a spring urged catch 136 normally catching over a lug 137 carried by the segment 115 and the above described connection between the segments 115 and 134 comprising the catch 136 is retained during check feeding operations so that the segment 134 is rocked clockwise simultaneously with the rocking of the segment 115. Segment teeth 138 of the segment 134 are in continuous mesh with a pinion 213 (Fig. 8) secured to the shaft 110 to which, it will be recalled, is secured the cam 209 for operating the impression block 106 to take an impression from the date printing wheels upon the check strip. The manner in which the printing impressions are effected is similar to that previously described.

The segment teeth 138 of the segment 134 are also in continuous mesh with a pinion 139 to which is attached a plate 140 (see Fig. 6) both of which are loosely mounted upon a shaft 141. Pivoted upon the plate 140 by a stud 142 is a spring urged clutch pawl 143 having a wedge-shaped clutch tooth 144 engaging a similar shaped recess of a clutch disk 145 secured to the shaft 141.

Figures 6, 7:
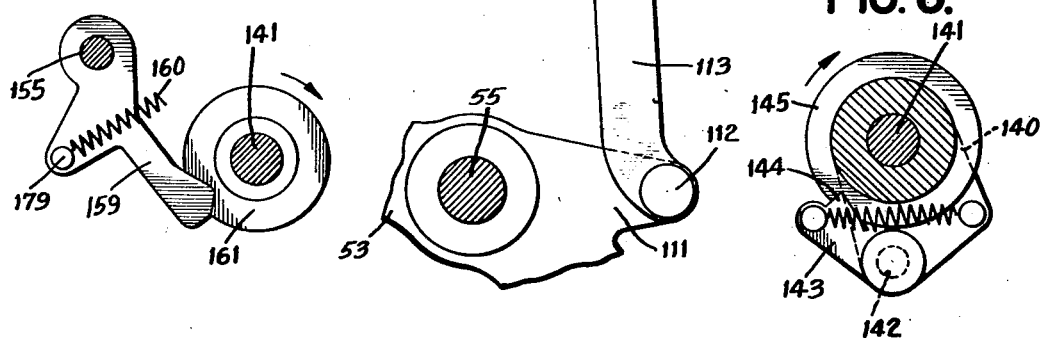
Fig. 6 is a detail view of a one way clutch device for causing the rotation of check feeding rollers by the reciprocable operating mechanism.
Fig. 7 is a detail view of an operating cam which controls the movement of the check paper strip clamping device.

The teeth 138 of the segment 134 are so proportioned as to rock the plate 140 and the clutch pawl 143 in a counterclockwise direction during the clockwise positioning of the segment 134, the clutch pawl 143 idly passing over the cam 145 until the clutch pawl again occupies the position shown in Fig. 6. Thereafter, by the reversal of the segment 134 the segment teeth 138 will rotate the pinion 139, the plate 140 and clutch pawl 143 in a clockwise direction. By the engagement of the clutch pawl 143 with the clutch disk 145, the shaft 141 will be rotated in a clockwise direction. To the shaft 141, as best shown in Fig. 5, there is secured a gear 146 meshing with a pinion 147 attached to a shaft 148. The pinion 147 meshes with a pinion 149 secured to the electrofeeding roller 126 and cooperating with the latter is the feeding roller 125 which is attached to the shaft 148.

The electroroller 126 is provided with a flattened portion 150 providing a recess between said flattened portion and the periphery of the feed roller 125 so as to permit the free insertion of the check strip and a sales slip which is positioned over the check strip. By means of the clutch connection previously described the restoration of the segment 134 will cause the clockwise rotation of the shaft 141 and through the pinions 147 and 149 rotate the electroroller 126 in a clockwise direction, the feed roller 125 rotating simultaneously in a counterclockwise direction. When the electrofeeding roller 126 is rotated clockwise a slight amount, the periphery thereof will engage with the periphery of the feed roller 125 to thereby feed the check strip 120, drawing it from the supply roll 119 and feeding it a certain amount so that it is fed through the aperture 129 of the plate 128. The portion of the check strip which is fed is manually detached from the rest of the strip by means of the serrated edge 130 of the plate 128.

The electrofeeding roller 126 is provided with an electroplate so that it will not only feed the check strip but also provide a suitable background impression upon the check paper as shown in Fig. 1a. The legends and identifying data printed by this electroplate may of course be varied for the different types of business and other commercial requirements.

The electroplate is inked by means of a felt roller 151 (Fig. 4) which is carried by a pair of arms 152 and 153 and urged by a suitable spring so that it continuously contacts with the electroplate. The felt roller 151 is, of course, saturated with ink.

It is desirable to provide means to firmly hold the check paper and to provide means to disable the holding means so that the check paper strip may be fed in the manner previously described.

As best shown in Fig. 5, the lower plate 127 is fixed at 154 but the free end of the plate is urged downwardly by the resiliency of the plate. Underlying said plate 127 there is loosely mounted on a stud 155 a yoke shaped frame 156 the cross piece of which underlies the resilient plate 127. The yoke shaped frame 156 is loose on the shaft 155 and one of the side arms of the yoke shaped frame has an integral extension 157 to which is connected a spring 158 thereby urging the yoke shaped frame 156 and the plate 127 upwardly so that the end of the check strip is firmly held between the plates 127 and 128. Loosely mounted upon the shaft 155 is an arm 159 which is urged by a spring 160 so that the extremity coacts as shown in Fig. 7 with a profile cam 161 secured to the shaft 141. At the initial rotation of the shaft 141, which is effected to cause the check feeding operations, the clockwise rotation of the cam 161 will cam the arm 159 so that a spring securing stud 179 carried thereby will cooperate with and rock the arm 157 thereby causing the yoke shaped frame 156 to be rocked in a clockwise direction to relieve the pressure between the plates 127 and 128. With this pressure relieved spring strip 127 will move downwardly so that the check strip may be freely fed after the printing operation from the different sets of type wheels. The relief of this pressure is retained during the check strip feeding operation and at the termination of the latter, the parts will again occupy the position shown in Fig. 5 with the yoke shaped frame 156 firmly holding the plate 127 against the upper plate 128 to firmly hold the check strip so that the ejected portion may be manually torn off by means of the serrated edge 130.

It is desirable to print upon an inserted slip and to cause check strip feeding operations to be suspended or prevented so as to prevent the useless feeding of the check strip and, furthermore, to stop the rotation of the electroroller 126, the feed roller 125 and the associated driving mechanism.

To this end, the machine is provided with a slidably mounted depressible "slip" key 162 which is depressed by the operator prior to an operation of the operating bar 20. The key cap of the key 120 is positioned exterior of the machine so that it may be manually depressed similar to the amount controlling keys hereinbefore referred to.

"Slip" key 162 is provided with an operating extension 163 which is in the plane of a lug 164 of the catch 136 so that when the "slip" key is depressed the extension 163 in engagement with the lug 164 will rock the catch 136 so as to disengage it from the lug 137. Pivotally mounted at 165 is a latch member 166 which, when the "slip" key 162 is depressed, will engage a shoulder 167 of the "slip" key 162 to thereby hold the same in depressed position to maintain the catch 136 in rocked position fully disengaged from the lug 137.

It is obvious, therefore, that when the segment 115 is rocked clockwise by an operation of the operating bar 20 segment 134 will not be rocked thereby preventing the operation of the latter and the mechanism driven thereby which causes the operation of the check feeding rollers and the operation of the impression block 106. The shaft 110 will, nevertheless, be rocked in the manner previously described so that only the platen 105 will effect printing impressions of the amount, the transaction and clerk's character upon the sales slip which is inserted between the plates 123 and 124 (Fig. 5). Of course, the date will not be printed upon the inserted slip, as sales slips usually carry this data.

The latch 136 has a depending integral extension 168 which is in the plane of the connecting stud 114 and the latter is effective during the time it is elevated to coact with the extension 168 and rock the latch 166 so as to release the "slip" key 162 and the latter is thereupon urged upwardly to its normal position by means of a spring 169.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cash register the combination with a set of amount printing elements, of a platen for printing from said set of elements, a reciprocable main operating mechanism for said cash register, an electroprinting roller and cooperating platen roller for printing and issuing a check, a segment reciprocated by said main operating mechanism, a one-way clutch driving means intermediate said segment and said electro roller and platen roller, means for selectively coupling said clutch driving means with said segment, and means operated by said segment for operating said platen to effect an impression from the amount printing elements on the issued check.

2. In a cash register the combination with a set of amount printing elements, of a platen therefor, a reciprocable main operating mechanism for said cash register, an electro-printing roller and a cooperating platen roller for printing and issuing a check, means operated by said reciprocable main operating mechanism for operating said platen to effect an impression upon an inserted slip or said issued check, a reciprocable segment, means for selectively coupling said segment to said reciprocable main operating mechanism, a one way clutch driving means intermediate said electroroller and platen roller and said segment, a "slip" key, and means carried thereby for operating said coupling means to effect upon an operation of the key the disconnection of said segment from said main operating mechanism.

3. In a cash register, the combination with a set of amount printing elements, of a platen therefor, a reciprocable main operating mechanism for said cash register, an electro-printing roller and a cooperating platen roller for printing and issuing a check, a reciprocable segment operated by said main operating mechanism for operating said platen to print on said check or inserted slip, a supplemental segment, a one way clutch driving means intermediate said electro-printing roller and platen roller and said supplemental segment, a spring urged catch member carried by one of said segments and engageable with the other segment for selectively connecting said segments, and means comprising a "slip" key for controlling the position of said catch member to selectively connect said segments in accordance with the selective operation of the "slip" key.

4. In a cash register, the combination with a set of amount printing elements, of a platen therefor, a reciprocable main operating mechanism for said cash register, an electroprinting roller and a cooperating platen roller for printing and issuing a check, a reciprocable segment operated by said main operating mechanism for operating said platen to print on said check or inserted slip, a supplemental segment, a one way clutch driving means intermediate said electro-printing roller and platen roller and said supplemental segment, a spring urged catch member carried by one of said segments and engageable with the other segment for selectively connecting said segments, a "slip" key, means carried by said "slip" key to effect by the operation of said key the movement of said catch member to disconnect said segments, means for latching said key in operated position, and means operated by said main operating mechanism for shifting said latching means to release said "slip" key.

FREDERICK L. FULLER.